United States Patent [19]
Viklund et al.

[11] Patent Number: 5,806,811
[45] Date of Patent: Sep. 15, 1998

[54] WIRE MANAGER FOR USE WITH STAND-OFF LEGS

[75] Inventors: Mark Viklund, New Milford; John A. Siemon, Woodbury, both of Conn.

[73] Assignee: The Siemon Company, Watertown, Conn.

[21] Appl. No.: 651,279

[22] Filed: May 22, 1996

[51] Int. Cl.⁶ .................................. F16L 3/00; F16L 3/23
[52] U.S. Cl. ......................... 248/49; 248/68.1; 248/188; 174/68.1
[58] Field of Search .......................... 248/49, 67.7, 68.1, 248/73, 188; 174/68.1, 68.3, 72 A, 101; 24/625

[56] References Cited

U.S. PATENT DOCUMENTS

| | | | |
|---|---|---|---|
| 3,523,667 | 8/1970 | Guerrero | 248/49 |
| 3,777,223 | 12/1973 | Chandler et al. | 174/72 A |
| 3,809,799 | 5/1974 | Taylor | 174/68.3 |
| 4,030,540 | 6/1977 | Roma | 248/68.1 X |
| 4,484,020 | 11/1984 | Loof et al. | 174/68.3 |
| 5,201,484 | 4/1993 | Thoen | 248/68.1 |
| 5,312,270 | 5/1994 | Siemon et al. | |
| 5,507,076 | 4/1996 | Anscher | 24/625 |
| 5,612,509 | 3/1997 | Market | 248/68.1 X |

FOREIGN PATENT DOCUMENTS 972773  10/1964  United Kingdom ................. 174/72 A

OTHER PUBLICATIONS

Anixter ("AT&T Systimax Premises Distribution System") 1992 Catalog.

*Primary Examiner*—Leslie A. Braun
*Assistant Examiner*—Stephen S. Wentsler
*Attorney, Agent, or Firm*—Fishman, Dionne, Cantor & Colburn

[57] ABSTRACT

A wire manager that is removably mountable to stand-off legs having at least one male latch. The wire manager includes a plurality of exterior retaining members and retaining members. Each exterior retaining member has a female latch for engaging the male latch located on the stand-off legs. The wire manager includes notches formed on each female latch and each exterior retaining member which receive nubs formed on the stand-off legs. Base plates of the wire manager include cross-shaped recesses for receiving cross-shaped projections formed on the stand-off legs. The notches and nubs along with the cross-shaped recesses and cross-shaped projections aid in aligning the wire manager and the stand-off legs.

10 Claims, 8 Drawing Sheets

WIRE MANAGER FOR USE WITH STAND-OFF LEGS

BACKGROUND OF THE INVENTION

1. Field of the Invention

The present invention relates generally to a wire manager and in particular, to a wire manager including a latching mechanism for easy attachment to and removal from stand-off legs.

2. Prior Art

Wiring block assemblies of the type described herein are well known and are commercially available from AT&T Technologies. U.S. Pat. No. 5,312,270, which is incorporated herein by reference, describes conventional wiring block assemblies commonly referred to as the 110 type wiring system. AT&T produces a trough for routing patch cords along the legs of 110 type wiring block assemblies. This trough is limited by its size, allowing only limited space for wire management along the legs of a 110 wiring block assembly. The AT&T trough is available with stand-off legs, however, the trough is not easily removed from the legs.

SUMMARY OF THE INVENTION

The above-discussed and other drawbacks and deficiencies of the prior art are overcome or alleviated by the wire manager of the invention. The present invention is a wire manager that is removably mountable to stand-off legs having at least one male latch. The wire manager includes a plurality of exterior retaining members and retaining members. Each exterior retaining member has a female latch for engaging the male latch located on the stand-off legs. The wire manager includes a notch formed on each female latch and each exterior retaining member which receive nubs formed on the stand-off legs. Base plates of the wire manager include cross-shaped recesses for receiving cross-shaped projections formed on the stand-off legs. The notches and nubs along with the cross-shaped recesses and cross-shaped projections aid in aligning the wire manager and the stand-off legs.

BRIEF DESCRIPTION OF THE DRAWINGS

Referring now to the drawings wherein like elements are numbered alike in the several FIGURES.

DETAILED DESCRIPTION OF THE INVENTION

Figure 1:
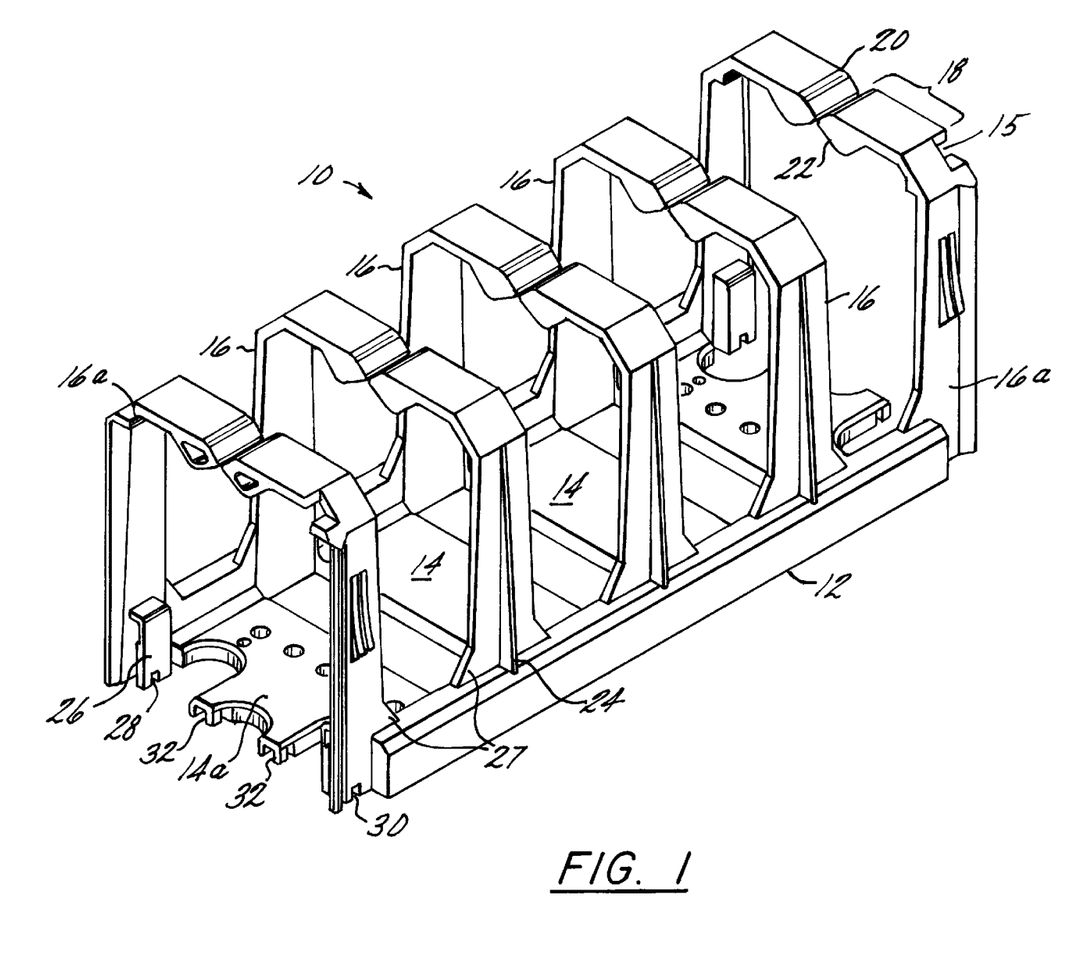
FIG. 1 is a perspective view of the wire manager of the present invention.

FIG. 1 is a perspective view of the wire manager of the present invention shown generally at 10. The wire manager 10 is useful for controlling wires adjacent to 110 type wiring block assemblies. The wire manager 10 includes two side rails 12 and a plurality of base plates 14 that provide structural support for the wire manager. Attached to each side rail are a series of retaining members 16 and exterior retaining members 16a. A flange 27 provides structural support at the connection between the retaining members 16 and 16a and the side rail 12. The retaining members 16 also include a rib 24 for providing additional support. The retaining members 16 and 16a include an end portion 18. The side rails 12, base plates 14, retaining members 16 and 16a, and end portions 18 form a wire management area for organizing and confining wires. The end portion 18 includes an upper bevel 20 formed on the top surface of the end portion 18 and a lower bevel 22 formed on the bottom surface of the end portion 18. The top bevel 20 provides for easy insertion of wires into the wire management area. The wire manager 10 is preferably made from a resilient plastic (although other materials may be used) so the retaining members 16 and the end portions 18 flex. A wire is inserted into the wire management area by spreading adjacent end portions 18. Once the wire is inserted into the wire management area, the retaining members 16 return to their original position, retaining the wires within the wire management area. To remove a wire, the end portions 18 are opened and the wire is removed. The lower bevel 22 prevents the wire from being caught on the end portion 18 upon removal. The lower bevel 22 also aids in positioning a wire for removal in the precise position between two adjacent end portions 18.

Exterior retaining members 16a include a female latch 26 which mates with a male latch on a stand-off leg described below. A latch notch 28 formed in the female latch 26, and a retaining member notch 30 formed on the bottom of the exterior retaining member 16a aid in aligning the female latch 26 to a male latch. Exterior base plates 14a include a cross-shaped recess 32 the engages a cross-shaped projection on the stand-off legs described below. The exterior base plates 14a also include holes 34 used for mounting the wire manager 10 to a panel. The exterior retaining members 16a include a notch 15 at the top of the exterior retaining member 16a. The notches 15 allows a conventional wiring block cover to be mounted to the wire manager 10.

Figure 2:
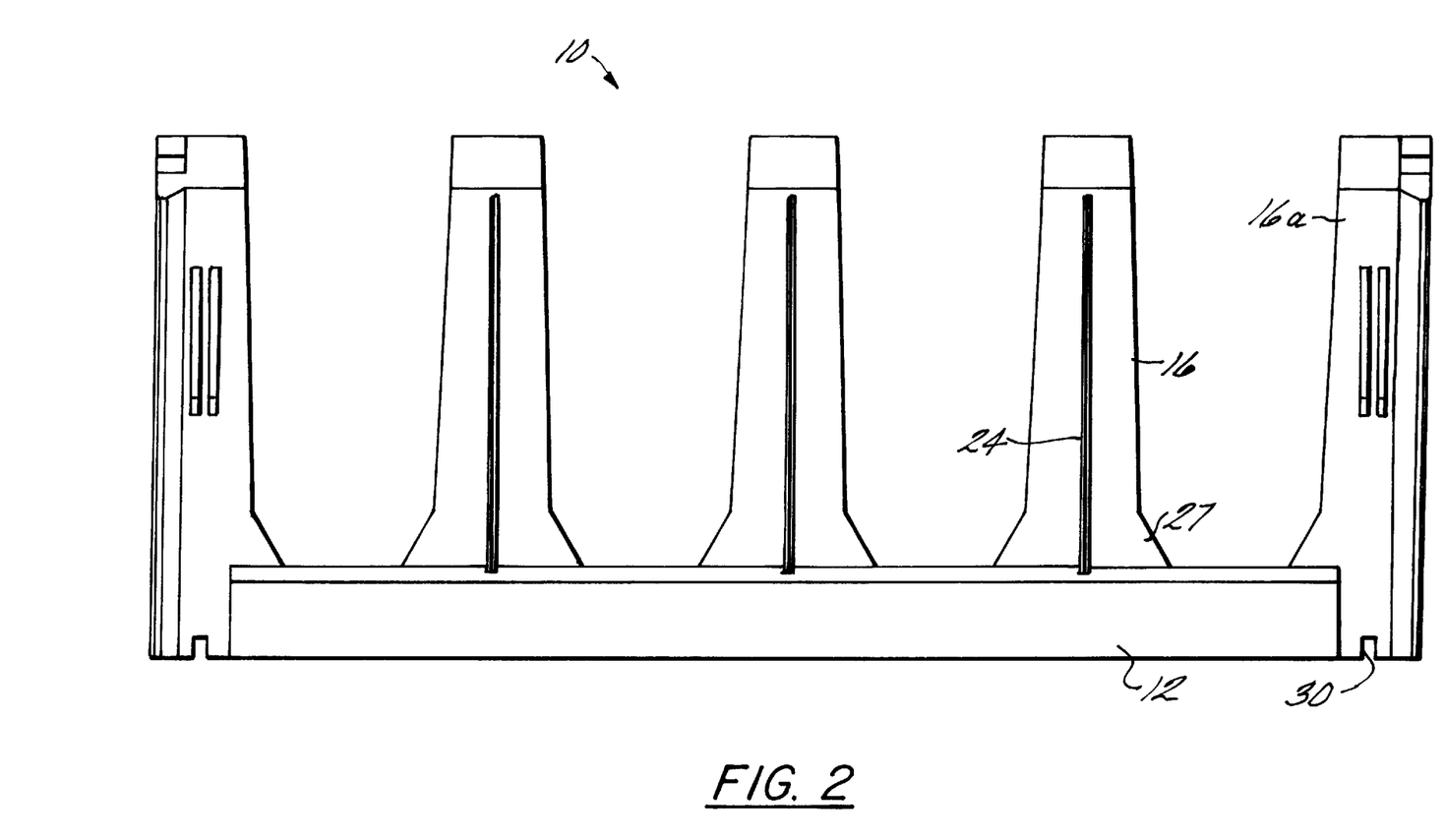
FIG. 2 is a front plan view of the wire manager shown in FIG. 1.
Figure 3:
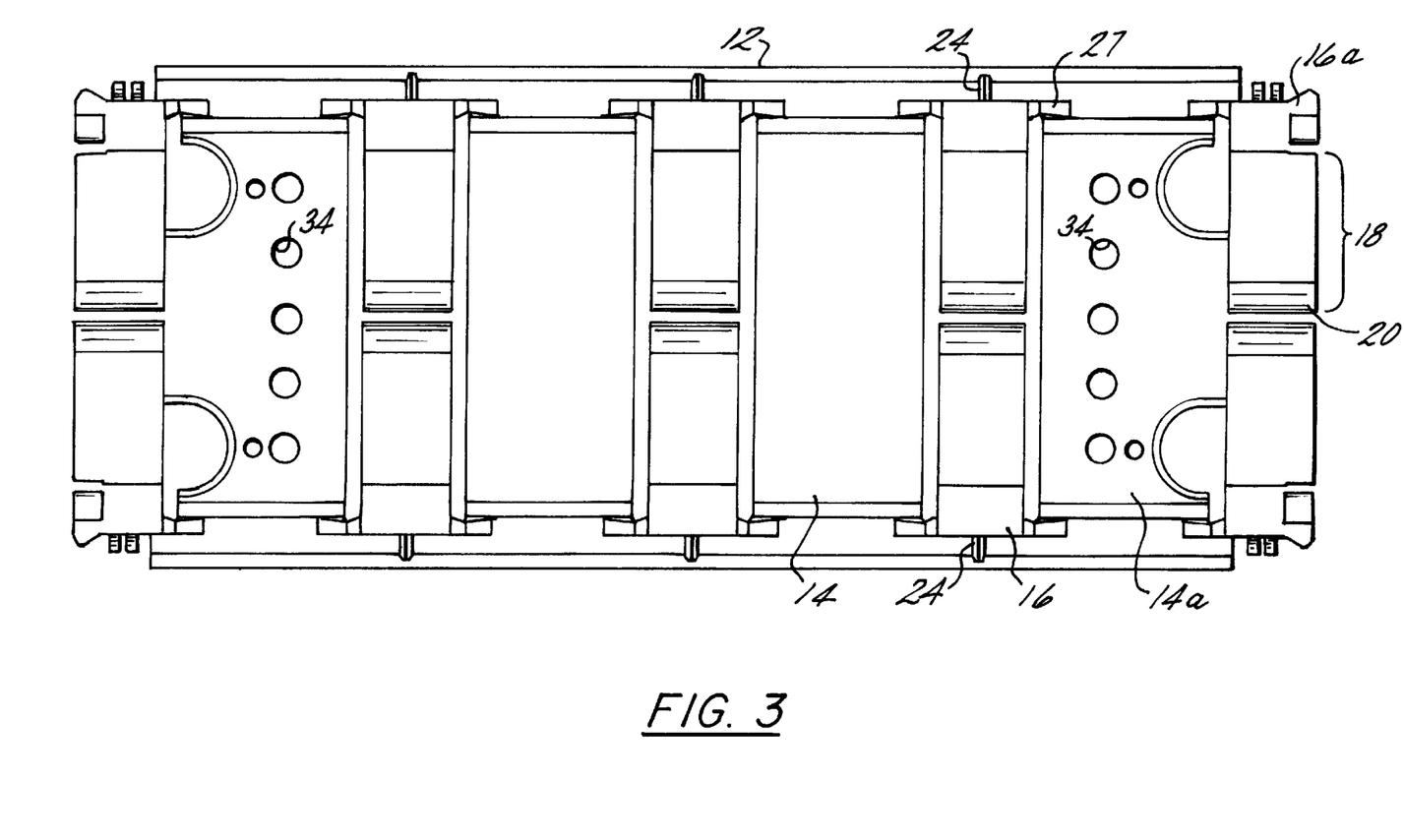
FIG. 3 is a top plan view of the wire manager shown in FIG. 1.
Figure 4:
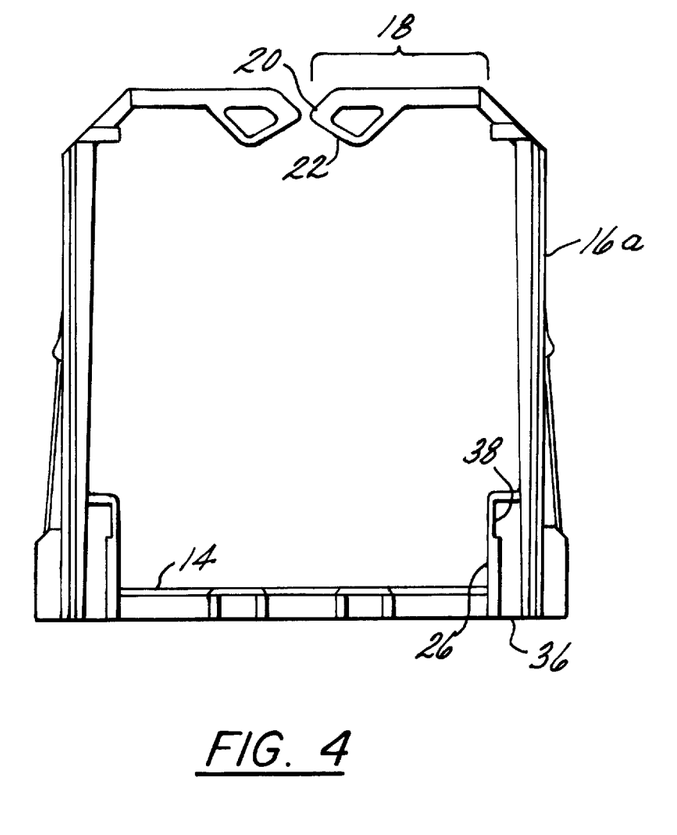
FIG. 4 is a side plan view of the wire manager shown in FIG. 1.

FIG. 2 is a front view and FIG. 3 is a top view of the wire manager 10 shown in FIG. 1. FIG. 4 is a side view of the wire manager 10 shown in FIG. 1 and illustrates the details of the female latch 26. The female latch 26 is an L-shaped member attached to the inside of the exterior retaining members 16a. The L-shaped member forms a chamber 36 which includes a recess 38 formed by removing a portion of the interior of the L-shaped member.

Figure 5:
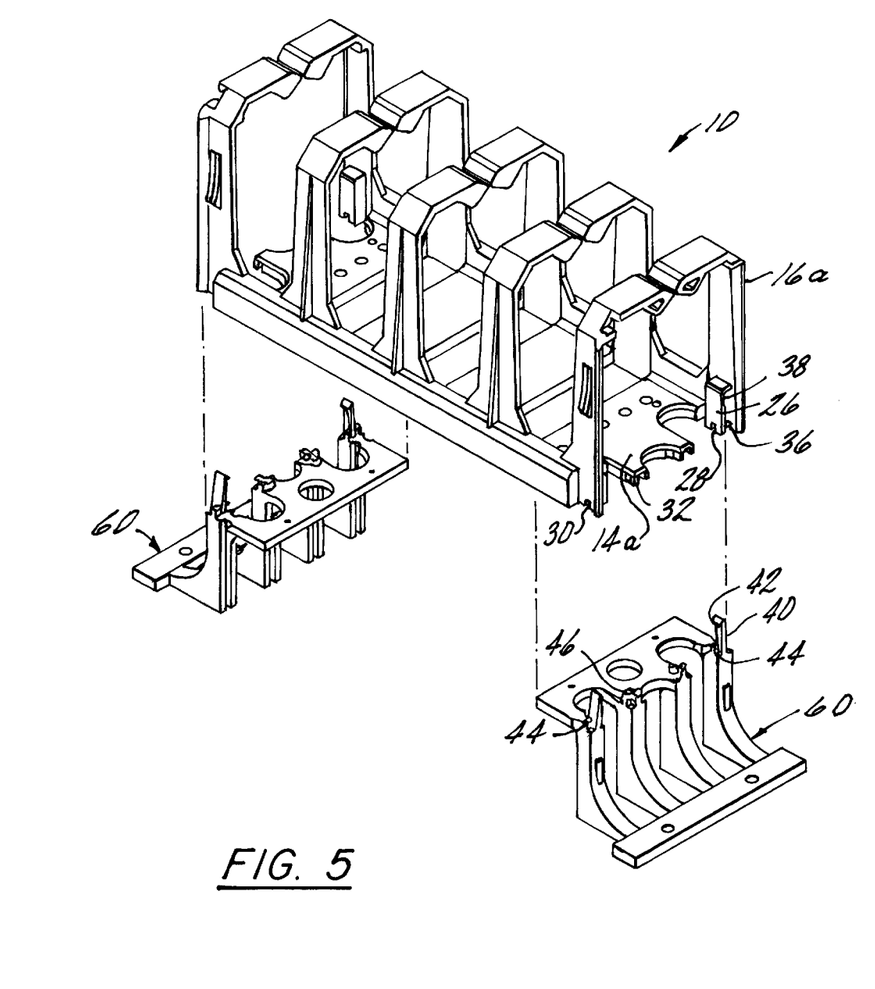
FIG. 5 is a perspective view of the wire manager of the present invention and conventional stand-off legs.
Figure 6:
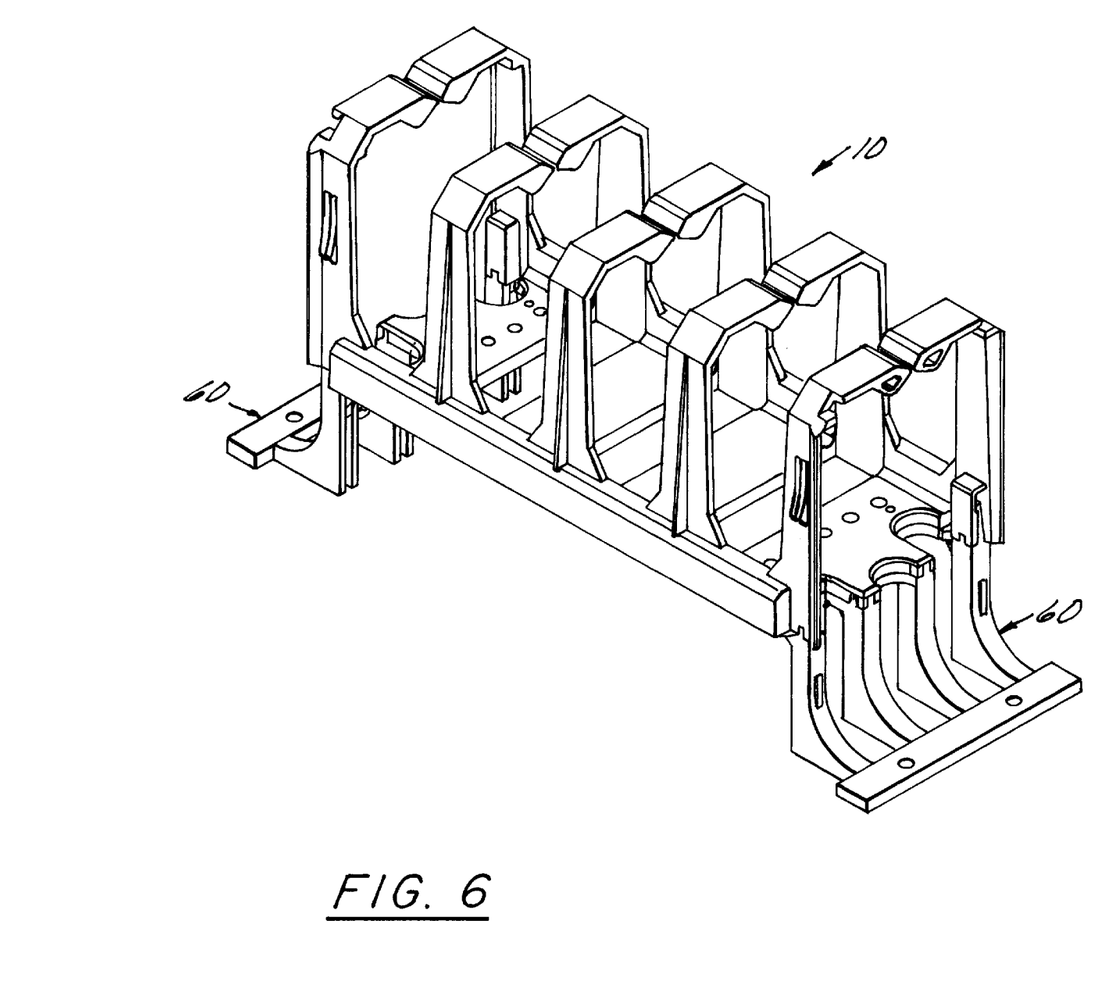
FIG. 6 is a perspective view of the wire manager of the present invention attached to the conventional stand-off legs.

FIG. 5 is a perspective view of the wire manager shown generally at 10 and a set of stand-off legs shown generally at 60. The stand-off leg 60 includes a male latch 40 which has a projection 42. The projection 42 has a width substantially equal to the width of the recess 38 formed in the female latch. The stand-off leg 60 also includes cross-shaped projections 46 and nubs 44. The male latch 40 engages the female latch 26 and projection 42 formed on the male latch 40 engages the recess 38 formed on the interior of the female latch 26. Nubs 44 formed on the stand-off leg 60 adjacent to the male latch 40 engage the notch 30 formed on the outside of the exterior retaining member 16a and notch 28 formed in the female latch 26. The cross-shaped projections 46 engage the cross-shaped recesses 32 formed on the bottom of the exterior base plate 14a. The nubs 44 and the notches 28 and 30 along with the cross-shaped projections 46 and the cross-shaped recesses 32 aid in aligning the wire manager 10 to the stand-off leg 60. These elements also provide structural support and prevent the wire manager 10 from moving relative to the stand-off legs 60. The projection 42 formed on the male latch 40 engages the recess 38 on the female latch 26 and holds the wire manager 10 to the stand-off leg 60. The wire manager 10 is preferably made from a resilient plastic, and when the female latch 26 is placed on the male latch 40, the female latch 26 flexes to receive the male latch 40. When the projection 42 engages the recess 38, the female latch 26 returns to its original state to grip the male latch 40. FIG. 6 is a perspective view of the wire manager 10 mounted to the stand-off legs 60. The wire manager 10 may be removed from the stand-off legs 60 by compressing the four outer legs 16a. The wire manager 10 does not interfere with cables that enter from beneath a wiring block assembly. The wire manager 10 may be mounted to legs that do not include a male latch 40 through fastening devices such as a screws.

Figure 7:
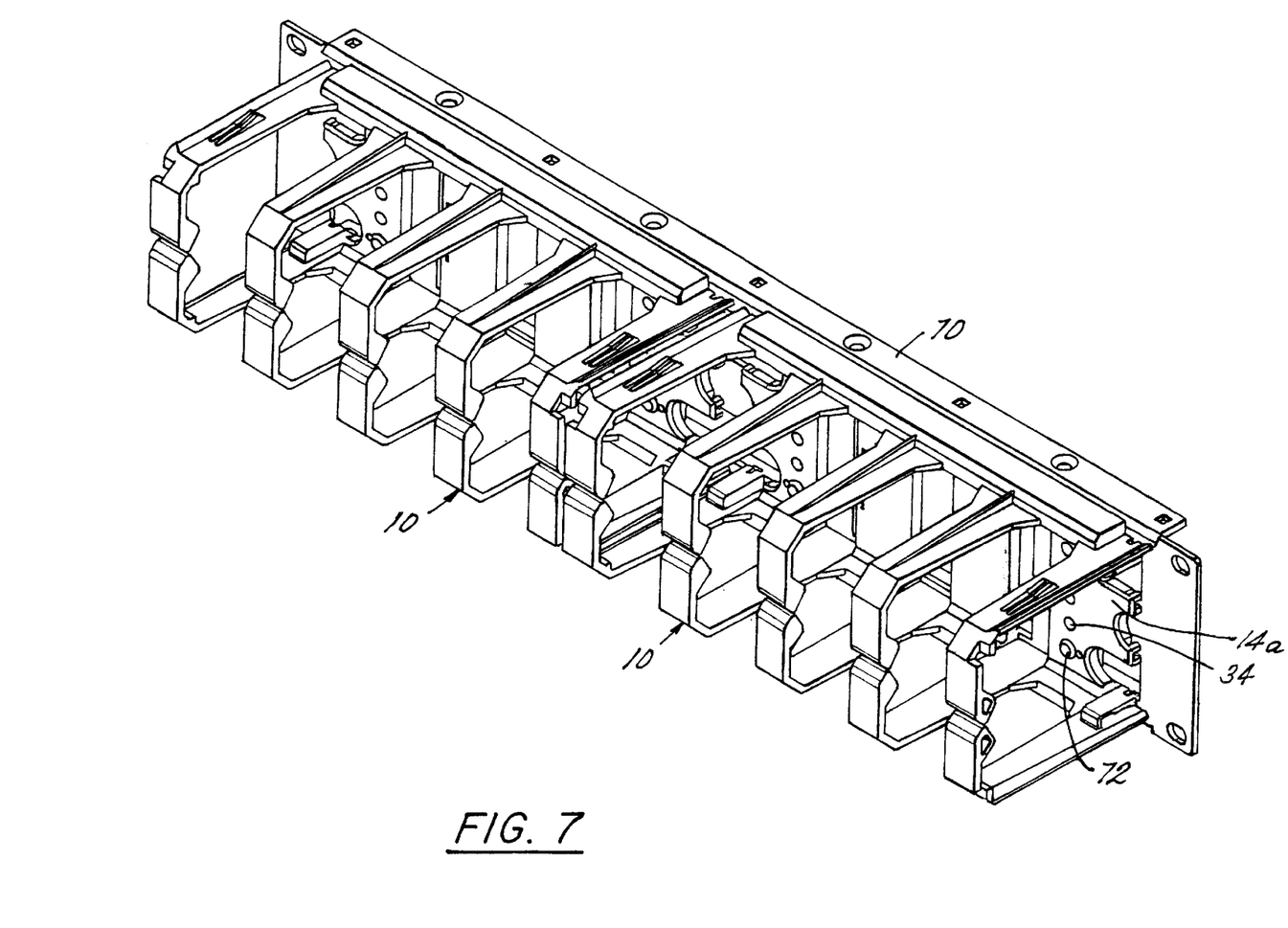
FIG. 7 is a perspective view of two wire managers of the present invention attached to a panel.
Figure 8:
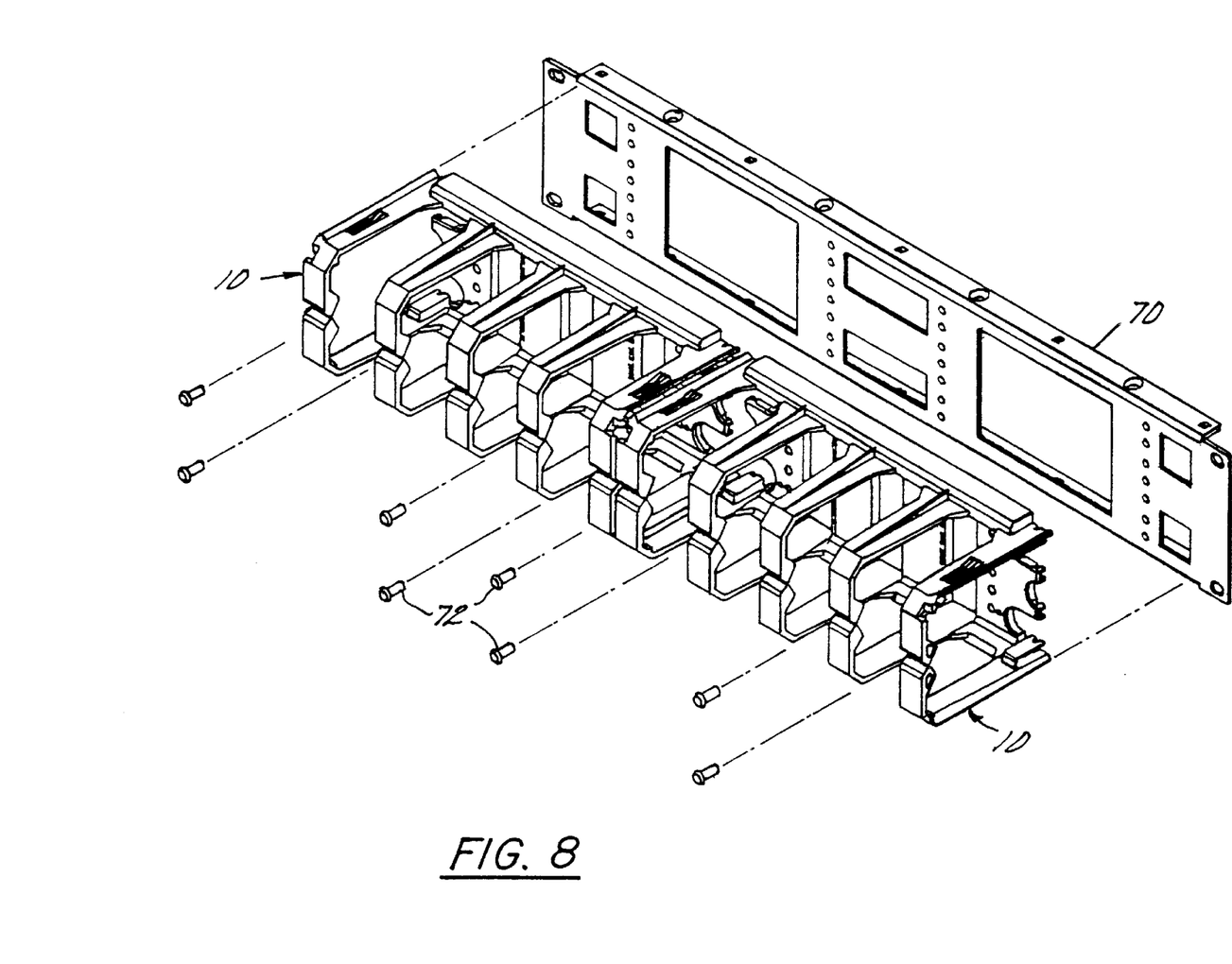
FIG. 8 is an exploded perspective view of FIG. 7.

FIG. 7 is a perspective view of two wire managers 10 mounted to a panel 70. As mentioned above, the exterior base plates 14a include holes 34 for mounting the wire manager 10 to a panel 70. A screw, rivet, or other fastening device 72 is used to attach the wire manager 10 to the panel 70. FIG. 8 is an exploded view of the wire managers 10, the panel 70 and the fastening devices 72 shown in FIG. 7.

The present invention provides improved wire management between wiring block assemblies. The wire manager of the present invention creates a neat, clean and organized installation of wires while also allowing easy removal of any of the wires at a later time. The inclusion of a female latch on the wire manager allows the wire manager to be easily attached to and removed from stand-off legs including a male latch. Alternatively, the wire manager can be attached to stand-off legs using screws or other fastening devices.

Although the wire manager 10 has been shown with a generally rectangular wire management area, alternate embodiments may include a wire manager with a different geometrical shape (square, round, oval, rectangular, triangular, etc.). The length and width of the wire manager 10 may also change and still achieve the same function. Thus, such modifications are within the scope of the invention.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A wire manager removably mounted to stand-off legs, the wire manager comprising:
   a base plate;
   a first side rail connected to said base plate;
   a second side rail connected to said base plate;
   a plurality of pairs of retaining members, each pair of retaining members including a first retaining member connected to said first side rail and having a first end portion and a second retaining member connected to said second side rail and having a second end portion, the first end portion and the second end portion of each of said plurality of pairs of retaining members extending towards each other and positioned proximate to each other;
   at least one of said retaining members having a first latch removably mounting the wire manager to the stand-off legs; and
   said stand-off legs including a second latch removably engaging said first latch.

2. The wire manager of claim 1 wherein said first latch is an L-shaped latch having one end connected to at least one of said retaining members of said plurality of pairs of retaining members to define a chamber for receiving said second latch.

3. The wire manager of claim 2 wherein said second latch includes a projection and said first latch includes a recess for receiving said projection.

4. The wire manager of claim 1 wherein said stand-off leg includes a first nub formed adjacent to said second latch and said first latch has a first notch for receiving said first nub.

5. The wire manager of claim 4 wherein said stand-off leg includes a second nub formed adjacent to said second latch and said at least one of said retaining members has a second notch for receiving said second nub.

6. The wire manager of claim 1 wherein said stand-off leg includes a cross-shaped projection and said base has a cross-shaped recess for receiving the cross shaped projection.

7. The wire manager of claim 1 wherein said first end portion includes an upper bevel.

8. The wire manager of claim 7 wherein said first end portion includes a lower bevel.

9. A wire manager removably mountable to stand-off legs, the wire manager comprising:
   a base plate;
   a first side rail connected to said base plate;
   a second side rail connected to said base plate;
   two pairs of exterior retaining members, each pair of exterior retaining members including a first exterior retaining member connected to said first side rail and having a first end portion and a second exterior retaining member connected to said second side rail and having a second end portion, the first end portion and the second end portion of each pair of exterior retaining members extending towards each other and positioned proximate to each other;
   at least one pair of retaining members, each of said at least one pair of retaining members including a first retaining member connected to said first side rail and having a first end portion and a second retaining member connected to said second side rail and having a second end portion, the first end portion and the second end portion of each of said at least one pair of retaining members extending towards each other and positioned proximate to each other;
   each of said exterior retaining members having a latch removably mounting the wire manager to stand-off legs.

10. The wire manager of claim 9 wherein said latch is an L-shaped latch.

* * * * *

UNITED STATES PATENT AND TRADEMARK OFFICE
CERTIFICATE OF CORRECTION

PATENT NO. : 5,806,811
DATED : September 15, 1998
INVENTOR(S) : Mark Viklund et al It is certified that error appears in the above-identified patent and that said Letters Patent is hereby corrected as shown below:

Column 4,
Line 31, delete "mountable" and insert therefor -- mounted --.

Signed and Sealed this

Twenty-fourth Day of July, 2001

*Attest:*

*Attesting Officer*

NICHOLAS P. GODICI
*Acting Director of the United States Patent and Trademark Office*